(12) United States Patent
Moran

(10) Patent No.: US 9,957,050 B2
(45) Date of Patent: May 1, 2018

(54) GALLEY CART AND GALLEY SYSTEM OF AN AIRCRAFT

(71) Applicant: THE BOEING COMPANY, Chicago, IL (US)

(72) Inventor: Thomas Joseph Moran, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 122 days.

(21) Appl. No.: 14/716,357

(22) Filed: May 19, 2015

(65) Prior Publication Data
US 2016/0340046 A1 Nov. 24, 2016

(51) Int. Cl.
| B64D 11/00 | (2006.01) |
| B64D 13/00 | (2006.01) |
| B64D 11/04 | (2006.01) |
| A47B 31/06 | (2006.01) |
| A47B 31/00 | (2006.01) |
| B64D 13/06 | (2006.01) |

(52) U.S. Cl.
CPC .......... B64D 13/00 (2013.01); B64D 11/0007 (2013.01); B64D 11/04 (2013.01); A47B 31/06 (2013.01); A47B 2031/002 (2013.01); B62B 2202/67 (2013.01); B62B 2204/00 (2013.01); B62B 2204/04 (2013.01); B64D 2013/0629 (2013.01)

(58) Field of Classification Search
CPC ...... B64D 13/00; B64D 11/007; B64D 11/04; B64D 2013/0629; B62B 3/02; B62B 2202/67; B62B 2204/00; A47B 31/06; A47B 2031/002
See application file for complete search history.

(56) References Cited

U.S. PATENT DOCUMENTS

| 4,361,014 A * | 11/1982 | Blain ..................... A47J 39/006 |
| | | 62/237 |
| 4,969,509 A * | 11/1990 | Merensky .............. B64D 13/08 |
| | | 165/104.34 |
| 6,845,627 B1 * | 1/2005 | Buck ..................... B64D 11/04 |
| | | 165/919 |

(Continued)

FOREIGN PATENT DOCUMENTS

DE  19952523 A1  5/2001

OTHER PUBLICATIONS

Extended European Search Report for corresponding EP Application No. 16167793.5-1754 dated Oct. 25, 2016 (8 pages).

*Primary Examiner* — Philip J Bonzell
(74) *Attorney, Agent, or Firm* — Jay J. Hoette; The Small Patent Law Group, LLC

(57) ABSTRACT

A galley cart includes walls defining an interior cavity extending between a front and a rear of the galley cart and the interior cavity extending between a top end and a bottom end. A supply port is provided in flow communication with the interior cavity at or near either the top end or the bottom end of the cart. A return port is provided in flow communication with the interior cavity that is adjacent the supply port at or near the top end or the bottom end of the cart. A barrier is positioned between the supply port and the return port within the interior cavity of the cart to define a supply chamber and a return chamber to control airflow through the interior cavity.

24 Claims, 3 Drawing Sheets

(56) References Cited

U.S. PATENT DOCUMENTS

| | | | |
|---|---|---|---|
| 9,487,299 B2 * | 11/2016 | Oswald | B64D 11/04 |
| 2010/0224726 A1 * | 9/2010 | Lu | F25D 17/06 |
| | | | 244/118.5 |
| 2012/0025679 A1 * | 2/2012 | Roering | B64D 11/0007 |
| | | | 312/236 |
| 2013/0047657 A1 * | 2/2013 | Oswald | B64D 11/04 |
| | | | 62/407 |
| 2013/0260662 A1 | 10/2013 | Burd | |
| 2013/0292102 A1 * | 11/2013 | Trumper | B64D 13/08 |
| | | | 165/168 |
| 2015/0007600 A1 * | 1/2015 | Godecker | B64D 11/04 |
| | | | 62/238.6 |
| 2015/0028157 A1 * | 1/2015 | Hoogeveen | B64D 11/0007 |
| | | | 244/118.1 |
| 2015/0059384 A1 | 3/2015 | Burd | |
| 2015/0059385 A1 | 3/2015 | Burd | |

* cited by examiner

GALLEY CART AND GALLEY SYSTEM OF AN AIRCRAFT

BACKGROUND

The present disclosure relates generally to systems and methods of cooling a galley of an aircraft.

Aircraft typically include multiple galleys to store food and beverages on the aircraft. The food and beverages are typically stored in galley carts which are transported to the aircraft and stored in refrigerated compartments or zones in the galleys. A heat exchanger is typically provided at the top of the galley and supplies cooled air to each of the compartments or zones via a plurality of air ducts and other components. The air ducts and the supply and return devices associated with the air ducts are routed along the rear wall of the galley to the cart compartment to supply the cooled air to the cart compartment and to return the air to the heat exchanger. For example, vertical ducts may extend from the heat exchanger, located above the galley, down the rear wall of the galley to the level of cart compartment, which is located at the bottom of the galley. Horizontal ducts may extend from the corresponding vertical ducts along the various galley carts to supply the air to, or return the air from, the galley carts and the cart compartment. In air-through-cart cooling arrangements, typically, the supply ducts are routed along the top of the cart compartment and interface with the galley carts to supply air at the top of the galley carts. The air flows through the galley carts to the bottom of the galley carts. The return ducts are routed along the bottom of the cart compartment and interface with the galley carts to receive the return air from the bottom of the galley carts.

A large amount of space is required for the airflow supply and return components, such as the ducts and the valves that interface with the galley carts. The footprint of the galley is wide enough to accommodate the galley carts as well as the airflow supply and return components. The galleys occupy valuable space within the cabin of the aircraft, which limits the number of passenger seats that may be provided on the aircraft. For example, the airflow supply and return components may add approximately 4-5 inches (in) (10-13 centimeters (cm)) of width to the galleys, and some aircraft may have eight or more galleys, leading to a large amount of cabin space dedicated to the airflow supply and return components, which may be used for other purposes.

SUMMARY

In accordance with one embodiment, a galley cart is provided including walls defining an interior cavity extending between a front and a rear of the galley cart and the interior cavity extending between a top end and a bottom end. A supply port is provided in flow communication with the interior cavity at or near either the top end or the bottom end of the cart. A return port is provided in flow communication with the interior cavity that is adjacent the supply port at or near the top end or the bottom end of the cart. A barrier is positioned between the supply port and the return port within the interior cavity of the cart to define a supply chamber and a return chamber to control airflow through the interior cavity.

In a further embodiment, a galley is provided including a rear wall, a mid-wall oriented with respect to the rear wall, and a cart compartment at least partially defined by the rear wall and the mid-wall. The cart compartment is configured to receive at least one galley cart. A first duct is defined in the rear wall below the mid-wall and in flow communication with the cart compartment. A second duct is defined in the rear wall directly below the first duct and in flow communication with the cart compartment.

In another embodiment, a galley is provided including a rear wall, a mid-wall oriented with respect to the rear wall, and a cart compartment at least partially defined by the rear wall and the mid-wall. The cart compartment is configured to receive at least one galley cart. A first duct is coupled to a lower surface of the mid-wall and in flow communication with the cart compartment. A second duct is coupled to the lower surface of the mid-wall and in flow communication with the cart compartment.

The features and functions that have been discussed can be achieved independently in various embodiments or may be combined in yet other embodiments, further details of which can be seen with reference to the following description and drawings.

DETAILED DESCRIPTION

Figure 1:
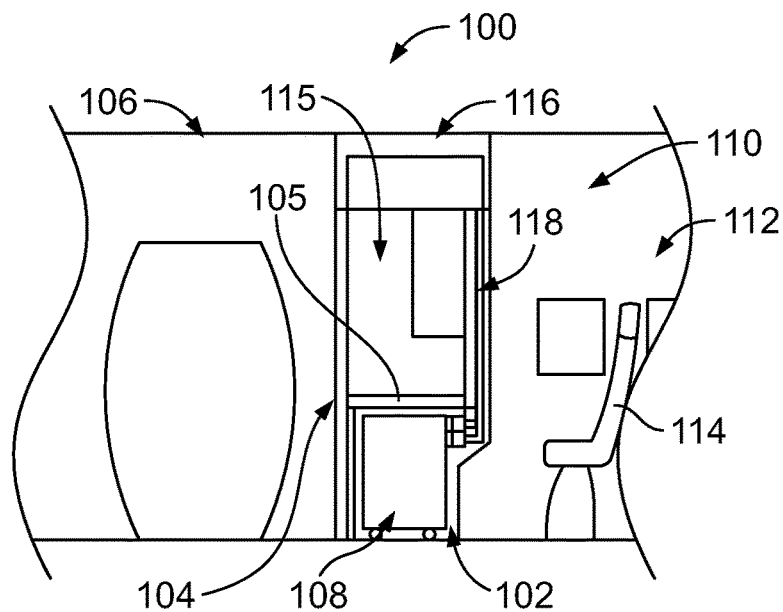
FIG. 1 is a schematic illustration of an exemplary galley system for an aircraft.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Described herein are various embodiments of a galley system for an aircraft configured to supply cooling air to a cart compartment of a galley monument, or simply galley, for cooling galley carts. Various embodiments provide cooling ducts of the galley system that are arranged to reduce a size or footprint of the galley monument, which may provide additional space in the passenger compartment, such as for adding additional room for passenger seating and/or additional leg room. Various embodiments provide an efficient cooling environment for the galley carts using air-through-cart cooling arrangements.

FIG. 1 is a schematic illustration of an exemplary galley system 100 for an aircraft 106. The galley system 100 is used to cool galley carts 108 held in cart compartments 102 of a galley 104. The galley 104 defines one or more cart compartments 102, which are typically arranged below a mid-wall 105 of the galley 104, which may define a counter and be referred to hereinafter as counter 105. The mid-wall 105 defines a top of the cart compartment 102. The galley 104 is positioned within a cabin 110 of the aircraft 106, and the cabin of the aircraft 106 is divided into a passenger area 112, where passenger seats 114 are located, and a galley area 115, where the galley 104 is located. The passenger area 112 is the area exterior of the galley 104 within the aircraft 106 where passengers are able to be located. The galley area 115 has a working area for the galley crew forward of the galley 104 where the cart compartments 102, counter 105 and cabinets or storage bins may be accessed. Space dedicated to the galley 104 is unusable for passenger seats 114 or other purposes such as lavatories, and thus it may be desirable for aircraft manufacturers to reduce the footprint of the galley area 115 in order to increase the passenger area 112 to increase revenue of each flight for aircraft operators.

As used herein a cart compartment is an insulated or uninsulated volume that is utilized to store one or more galley carts on the aircraft 106. A galley cart, as used herein, is a portable device that is used to store food and/or beverages that are transported from a caterer to the aircraft 106 or from the cart compartments 102 to other parts of the aircraft 106 for serving the food and/or beverages. The galley carts may include wheels, however some galley carts may be hand carried boxes in some embodiments.

The galley 104 may include any number of cart compartments 102 and the aircraft 106 may include any number of galleys 104. The galleys 104 are typically arranged near the doors of the aircraft 106, such as at the fore and/or aft of the cabin 110, but may be located mid-cabin in some embodiments. Each cart compartment 102 may hold any number of galley carts 108. The galleys 104 may be used for the storage and/or preparation of food or beverages. Some galleys may be bar units used strictly for preparation of beverages. Some galleys may be incorporated into other monuments used for other purposes such as closets, workstations, lavatories, and the like.

The galley system 100 includes a heat exchanger 116 that provides cooled air. The heat exchanger 116 may be positioned above the galley 104 (e.g., in the crown of the aircraft 106), as in the illustrated embodiment, may be positioned in the galley 104, or may be positioned below the galley 104 (e.g., in the belly of the aircraft 106). The galley system 100 includes an airflow supply and return system 118, in flow communication with the heat exchanger 116 and the cart compartments 102, to channel the air supply from the heat exchanger 116 to the cart compartments 102 and back to the heat exchanger 116.

Figure 2:
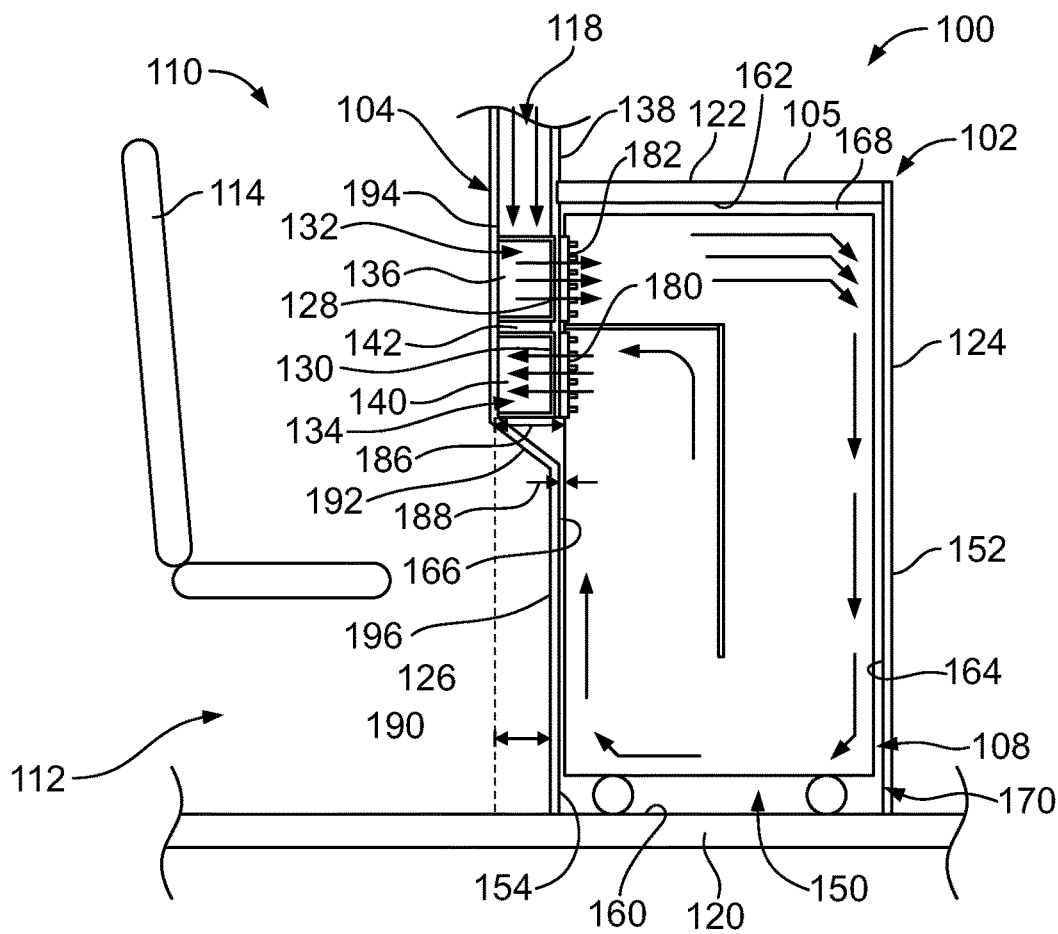
FIG. 2 is a cross-sectional view of a galley of the galley system in accordance with an exemplary embodiment.

FIG. 2 is a cross-sectional view of the galley 104 and galley system 100 in accordance with an exemplary embodiment. The galley 104 includes a bottom 120, a top, a front 124 and a rear 126 opposite the front 124, and may include at least one side (not shown). The galley 104 includes a first opening 128 into the cart compartment 102 and a second opening 130 into the cart compartment 102. Air can flow into and out of the cart compartment 102 through the first and second openings 128, 130, respectively. For example, the airflow supply and return system 118 may be in flow communication with the first and second openings 128, 130. Optionally, multiple openings 128, 130 may be provided. The rear 126 may be fore facing, aft facing or side facing, depending on the orientation of the galley 104 within the cabin 110. The rear 126 may face the passenger area 112 (e.g., passenger seats 114 may be located behind the rear 126, in front of the rear 126, and the like); however in alternative embodiments, the rear 126 may be positioned against a bulkhead.

In an exemplary embodiment, the heat exchanger 116 is positioned at the top of the galley 104. The heat exchanger 116 includes a fan used to increase the flow of air through the galley system 100. The fan forces the airflow through the airflow supply and return system 118 and directs the air over a galley chilling unit used to reduce the temperature of the airflow. The fan may be positioned in the airflow supply and return system 118, such as between a return duct and a supply duct. The fan may be positioned upstream of the galley chilling unit; however, the fan may be positioned at other locations in alternative embodiments. In one embodiment, the galley chilling unit is a liquid-cooled galley chilling unit that provides chilled liquid, such as a refrigerant, to the heat exchanger 116 to cool the air supply. Heat exchanging of the liquid may be performed remote from the heat exchanger 116 and from the galley 104, such as in the belly of the aircraft 106. In another embodiment, the galley chilling unit is a conventional refrigeration unit, which includes an evaporator, a condenser, a compressor, and an expansion valve (not shown).

The airflow supply and return system 118 is arranged within the galley 104. Components of the airflow supply and return system 118 may be routed in various locations to supply and return the air as needed. In the illustrated embodiment, components of the airflow supply and return system 118 are generally arranged along the rear 126 of the galley 104, such as behind the cabinets, cart compartments 102, and other compartments of the galley 104. In an exemplary embodiment, the components of the airflow supply and return system 118 are routed in areas to reduce a depth of at least a portion of the galley 104. For example, one or more ducts of the airflow supply and return system 118 are routed to locations other than behind the cart compartment 102 to reduce the depth of the cart compartment 102, which may decrease the footprint of the galley area 115, and thus increase the footprint of the passenger area 112.

The airflow supply and return system 118 includes a plurality of ducts to supply and return air to the cart compartment 102 and the galley cart 108. For example, the system 118 includes at least one cooling air supply duct 132 (may be referred to as a first duct 132 or a second duct 132) to supply cooled air to the cart compartment(s) 102 and at least one air return duct 134 (may be referred to as a first duct 134 or a second duct 134) to return air to the heat exchanger 116. The ducts 132, 134 may be embedded in the walls or structures defining the galley 104 and/or the cabinets, compartments, and the like of the galley 104. The ducts 132, 134 may be defined by separate structures, such as sheet metal ducts preformed and set in the walls. Alternatively, the ducts 132, 134 may be defined by the walls themselves, such as by bores or channels in the walls. The walls may define portions or sides of the ducts 132, 134.

Optionally, the air supply duct 132 may include a horizontal supply duct 136 and a vertical supply duct 138. The vertical supply duct 138 extends between the horizontal supply duct 136 and the heat exchanger 116. The horizontal supply duct 136 may extend into each of the cart compartments 102 to supply cooled air to each of the cart compartments 102. The horizontal supply duct 136 may define a manifold for supplying cooled air to multiple cart compartments 102. In the illustrated embodiment, the horizontal supply duct 136 is positioned at the rear 126, such as behind the cart compartment(s) 102. The horizontal supply duct 136 may be positioned at other locations in alternative embodiments, such as along the top of the cart compartments 102 (e.g., directly under the counter 105 above the galley carts 108), along the bottom 120 (e.g., along the floor below the galley carts 108), and the like. Other arrangements of supply and return ducts are possible in alternative embodiments.

Optionally, the air return duct 134 may include a horizontal return duct 140 and a vertical return duct 142. The vertical return duct 142 extends between the horizontal return duct 140 and the heat exchanger 116. The horizontal return duct 140 may extend into each of the cart compartments 102 to return air from each of the cart compartments 102. In the illustrated embodiment, the horizontal return duct 140 is positioned at the top of the cart compartment 102, such as above the galley cart 108. The horizontal return duct 140 may be positioned at other locations in alternative embodiments, such as along the bottom of the cart compartments 102, along the rear 126, and the like. Other arrangements of supply and return ducts are possible in alternative embodiments.

The cart compartment 102 is positioned near the bottom 120, such as below the counter 105, for loading and unloading of the galley carts 108 into a cavity 150 defined by the cart compartment 102. Cabinets or other non-cooled compartments may be provided above the cart compartment 102, such as above the counter area of the galley 104. In some alternative embodiments, cooled compartments may be provided above the counter area and the airflow supply and return arrangements described herein may be useful for such cooled compartments, such as to provide more counter space or larger (e.g., deeper) containers that may be placed in such cooled compartments. Optionally, the cart compartment 102 may have one or more doors 152 at the front 124 that may be opened to provide access to the cavity 150 of the cart compartment 102, such as to load and unload the galley carts 108 through the front 124. The door(s) 152 may be closed to retain the galley carts 108 in the cart compartment 102 and/or to enclose the cooling space in the cavity 150 and/or to provide thermal insulation. In an exemplary embodiment, when the galley cart 108 is positioned in the cavity 150, a space is defined about the galley cart 108. Optionally, air may be able to flow around the galley cart 108 in the space. In alternative embodiments, because the cooling may be by an air-through-cart supply arrangement, the cart compartment 102 may be provided without the doors 152.

The cart compartment 102 includes a plurality of walls 154 defining the cavity 150. The first and second openings 128, 130 may extend at least partially through the walls 154. In an exemplary embodiment, the cart compartment 102 includes a bottom wall 160, a top wall 162, a front wall 164, a rear wall 166 and side walls 168. The side walls 168 may separate adjacent cart compartments 102. In alternative embodiments, the galley 104 may only include side walls 168 along the exterior sides of the galley 104 and may be devoid of internal side walls separating the cart compartments 102. In such embodiments, each of the cart compartments 102 may be open to each other. The front wall 164 includes a doorway 170 defined therethrough. The doorway 170 allows the galley cart 108 to be loaded into, and unloaded from, the cart compartment 102. The door 152 is coupled to the front wall 164 to close the doorway 170. The top wall 162 may be defined by the counter 105 of the galley 104. The bottom wall 160 may be defined by a floor of the cabin 110.

The rear wall 166 may define the rear 126 of the galley 104. The rear wall 166 may be exposed to the exterior environment of the galley 104. For example, the rear wall 166 may be exposed to the passenger area 112 of the cabin 110. The rear wall 166 is provided opposite the front wall 164 and the door 152. In an exemplary embodiment, at least a portion of the rear wall 166 is shifted forward, as compared to galley monuments that provide airflow supply or return components along the rear wall 166, to reduce the footprint of the galley 104. At least a portion of the rear wall 166 is shifted toward the galley cart 108 to reduce the volume of the cavity 150 of the cart compartment 102. Such reduction in volume of the cart compartment 102 equates to an increase in volume of the passenger area 112. For example, more space may be provided for passenger seats 114. For example, more leg room may be provided for passengers in the passenger seats 114. To create additional room in the cart compartment 102, for shifting the rear wall 166 toward the galley cart 108, at least some of the components of the airflow supply and return system 118 may be moved away from such portions of the rear wall 166. For example, portions or all of the rear wall 166 may be devoid of air ducts or other components of the airflow supply and return system 118. In the illustrated embodiment, both the supply and return ducts 132, 134 are located at or near the top wall 162. The supply and return ducts 132, 134 are positioned adjacent each other, as opposed to apart from each other as is typical of conventional systems. In the illustrated embodiment, the supply and return ducts 132, 134 are both positioned directly below the counter 105 and the rear wall 166 below the supply and return ducts 132, 134 is jogged or shifted forward to reduce the width of the cavity 150.

In an exemplary embodiment, the airflow supply and return system 118 includes an air supply device 180 and an air return device 182. The air supply device 180 is provided at the first opening 128. The air return device 182 is provided at the second opening 130. The air supply device 180 is in flow communication with the air supply duct 132. The air return device 182 is in flow communication with the air return duct 134. In various embodiments, the airflow devices 180 and/or 182 may be cart valves configured to engage and/or mate with the galley cart 108. For example, the airflow devices 180, 182 may seal to corresponding vents or openings of the galley cart 108 to provide a flow of air through the vents/openings of the galley cart 108. The galley cart 108 may include complementary valve for interfacing with the devices 180, 182. In other embodiments, the airflow devices 180 and/or 182 may be air grills through which air is able to flow. The air grill does not necessarily engage the galley cart 108 but rather may be position within the cavity 150 to direct air into, or receive air from, the galley cart 108.

The airflow supply and return system 118 is in flow communication with the galley cart 108. For example, the air supply duct 132 is in flow communication with the first opening 128 of the cart compartment 102, such as at the air supply device 180, and is in flow communication with the galley cart 108. The air return duct 134 is in flow communication with the second opening 130 of the cart compartment 102, such as at the air return device 182, and is in flow communication with the galley cart 108. During use, flow of air through the supply and return system 118 flows through the air supply duct 132, through the air supply device 180 and into the galley cart 108. The air passes over the food or beverages in the galley cart 108 by an air-through-cart supply arrangement. The air from the galley cart 108 then flows from the galley cart 108 through the return device 182 and into the air return duct 134.

In an exemplary embodiment, both the air supply duct 132 and the air return duct 134 are routed along the rear wall 166 within the top half of the cart compartment 102. The ducts 132, 134 may be internal air ducts running along the rear wall 166 and positioned within the rear wall 166. The ducts 132, 134 may run along the interior surface of the rear wall 166 within the cavity 150. In the illustrated embodiment, the rear wall 166 along the top half is generally positioned a first distance 186 from a rear of the galley cart 108, whereas the rear wall 166 along the bottom half is generally positioned a second distance 188 from the rear of the galley cart 108. The first distance 186 is different than the second distance 188. In the illustrated embodiment, the first distance 186 is greater than the second distance 188. In other words, the rear wall 166 in the top half is positioned further rearward as compared to the rear wall 166 in the bottom half, which is positioned further forward. Moving the rear wall 166 forward toward the galley cart 108 reduces the footprint of the galley 104 and provides additional gained space 190 in the passenger area 112. For example, shifting the rear wall 166 forward increases leg room of the row of passenger seats 114 behind the cart compartment 102.

In other various embodiments, the first and second openings 128, 130 of the cart compartment 102 are provided in different walls of the cart compartment 102. For example, the first opening 128 is provided in the rear wall 166 while the second opening 130 is provided in the top wall 162. By moving the second opening 130 to the top wall 162, as opposed to being positioned in the rear wall 166, such as below the first opening 128, space is freed up in the bottom half of the cart compartment 102. The rear wall 166, in the bottom half, such as below the air supply components, may be moved inward or forward toward the galley cart 108.

In an exemplary embodiment, the rear wall 166 includes a jogged section 192 that shifts portions of the rear wall 166 closer to the galley cart 108 as compared to other portions. For example, the rear wall 166 is non-planar with an upper rear wall 194 above the jogged section 192 and a lower rear wall 196 below the jogged section 192. In the illustrated embodiment, the upper rear wall 194 is positioned the first distance 186 (e.g., further from) from the galley cart 108 and the lower rear wall 196 is positioned the second distance 188 (e.g., closer to) from the galley cart 108. Optionally, the jogged section 192 may be positioned close to the counter 105 to provide a large amount of space savings and more leg room for the passenger area 112. For example, the jogged section 192 may be positioned in close proximity to the air supply and return components, such as immediately below the air supply and return ducts 132, 134. Positioning the jogged section 192 as such provides the greatest amount of gained space 190 (shown by the dashed line) in the passenger area 112. Additionally, by providing thin ducts 132, 134 (e.g., short in the vertical direction), the amount of space below the counter 105 needed for routing of the ducts 132, 134 is reduced, allowing the jogged section 192 to be moved further upward.

In an exemplary embodiment, the jogged section 192 reduces the depth of the corresponding portion (e.g., the bottom half) of the cavity 150 by a significant amount. For example, the jogged section 192 may reduce the depth of the cavity 150 by at least 5%. Optionally, the jogged section 192 may reduce the depth of the cavity 150 by 10% or more. The jogged section 192 may increase leg room of rows of passenger seats 114 behind the cart compartment 102. Optionally, the jogged section 192 may shift the position of the lower rear wall 196 of the rear wall 166 by at least 3 in (7.6 cm). The jogged section 192 may shift the lower rear wall 196 by more than 3 in (7.6 cm) in alternative embodiments. In aircraft 106 having multiple galley monuments 104, reducing the footprint of multiple galley monuments 104 may allow additional rows of passenger seats 114 in the aircraft 106, which may increase the revenue produced by the aircraft 106.

The jogged section 192 transitions the lower rear wall 196 vertically below the ducts 132, 134. As such, an exterior environment behind the cart compartment 102, which defines a portion of the passenger area 112 as positioned vertically below a portion of the galley 104. For example, a portion of the passenger area 112 encroaches below the galley 104, which allows the volume of the passenger area 112 to encroach upon what would otherwise be part of the galley monument footprint. As such, the footprint of the passenger area 112 over laps with the footprint of the galley area 115 to increase the usable space of the cabin 110. In alternative embodiments, the entire rear wall 166 may be shifted forward such that the rear wall 166 is planar, such as when the ducts 132, 134 are not routed behind the galley carts 108 but rather are routed from below the galley carts 108 or routed through the cabinets and counter 105 from above to a position above the galley carts 108.

Figure 3:
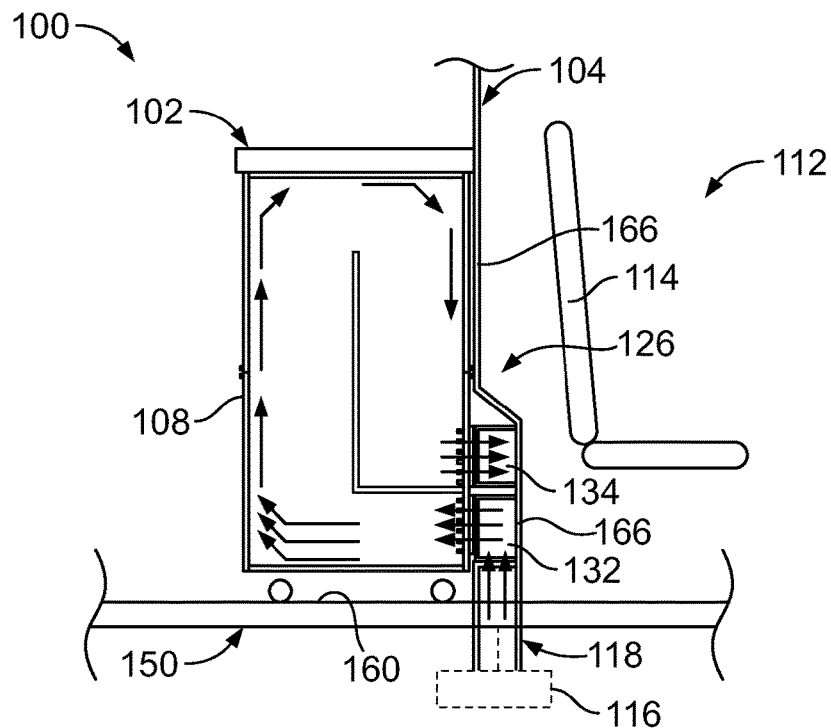
FIG. 3 is a cross-sectional view of a portion of the galley and galley system in accordance with an exemplary embodiment.

FIG. 3 is a cross-sectional view of a portion of the galley 104 and galley system 100 in accordance with an exemplary embodiment. FIG. 3 illustrates various components of the airflow supply and return system 118 in different locations than the embodiment illustrated in FIG. 2. In the illustrated embodiment, the rear 126 of the galley 104 is forward facing with the passenger seats 114 positioned forward of the galley 104. Optionally, the heat exchanger 116 (shown schematically in FIG. 3) is positioned below the galley 104, such as below the floor.

The airflow supply and return system 118 is arranged within the galley 104 to direct the air into the cart compartment 102 and the galley carts 108. In the illustrated embodiment, some components of the airflow supply and return system 118, such as the air supply duct 132 and the air return duct 134, are arranged along the rear wall 166 of the cart compartment 102 near the bottom wall 160. The upper half of the cart compartment 102 is devoid of the ducts, allowing the rear wall 166 to be shifted or jogged inward to reduce a depth of at least a portion of the cart compartment 102. The rear wall 166 in the top half is shifted inward toward the galley cart 108 to reduce the depth of the cart compartment 102 in the associated area (e.g., in the top half). At least a portion of the rear wall 166 is shifted toward the galley cart 108 to reduce the volume of the cavity 150 of the cart compartment 102. Such reduction in volume of the cart compartment 102 equates to an increase in volume of the passenger area 112. For example, more space may be provided for passenger seats 114. For example, more seat reclining room may be provided for the passenger seats 114.

Figure 4:
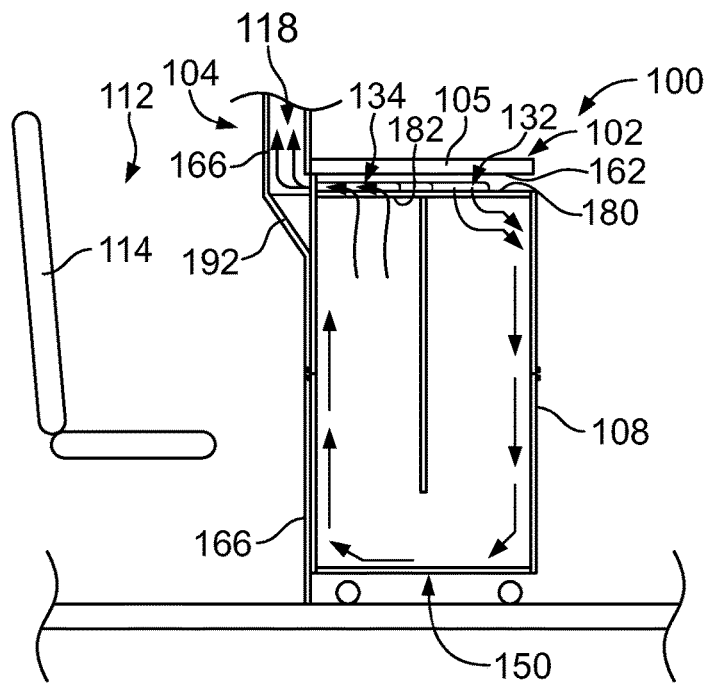
FIG. 4 is a cross-sectional view of a portion of the galley and galley system in accordance with an exemplary embodiment.

FIG. 4 is a cross-sectional view of a portion of the galley 104 and galley system 100 in accordance with an exemplary embodiment. FIG. 4 illustrates various components of the airflow supply and return system 118 in different locations than the embodiment illustrated in FIGS. 2 and 3. The airflow supply and return system 118 is arranged within the galley 104 to direct the air into the cart compartment 102 and the galley carts 108.

In the illustrated embodiment, none of the components of the airflow supply and return system 118 are provided along the rear wall 166 of the cart compartment 102. Rather, the air supply duct 132 as well as the air return duct 134 are provided along the top wall 162 defined by the counter 105. The ducts 132, 134 and the corresponding air supply device 180 and air return device 182 are vertically aligned with the galley cart 108, in the illustrated embodiment, above the galley cart 108; however in alternative embodiments, the air supply duct 132 and the air supply device 180 as well as the air return duct 134 and air return device 182 may be positioned below the galley cart 108. The rear wall 166 is devoid of any air ducts, to reduce a depth of at least a portion of the cart compartment 102. For example, the rear wall 166 in both the top half and the bottom half is shifted inward toward the galley cart 108, as compared to galley monuments that provide airflow supply or return components along the rear wall 166, to reduce the depth of the cart compartment 102. The rear wall 166 is shifted toward the galley cart 108 to reduce the volume of the cavity 150 of the cart compartment 102. For example, the jogged section 192 may be located immediately below the counter 105. Such reduction in volume of the cart compartment 102 equates to an increase in volume of the passenger area 112. For example, more space may be provided for passenger seats 114. In other embodiments, rather than having the jogged section above the counter 105, the ducts 132, 134 may be provided above the counter so that the depth of the galley 104 is reduced along the entire height (e.g., from the top to the floor).

Figure 5:
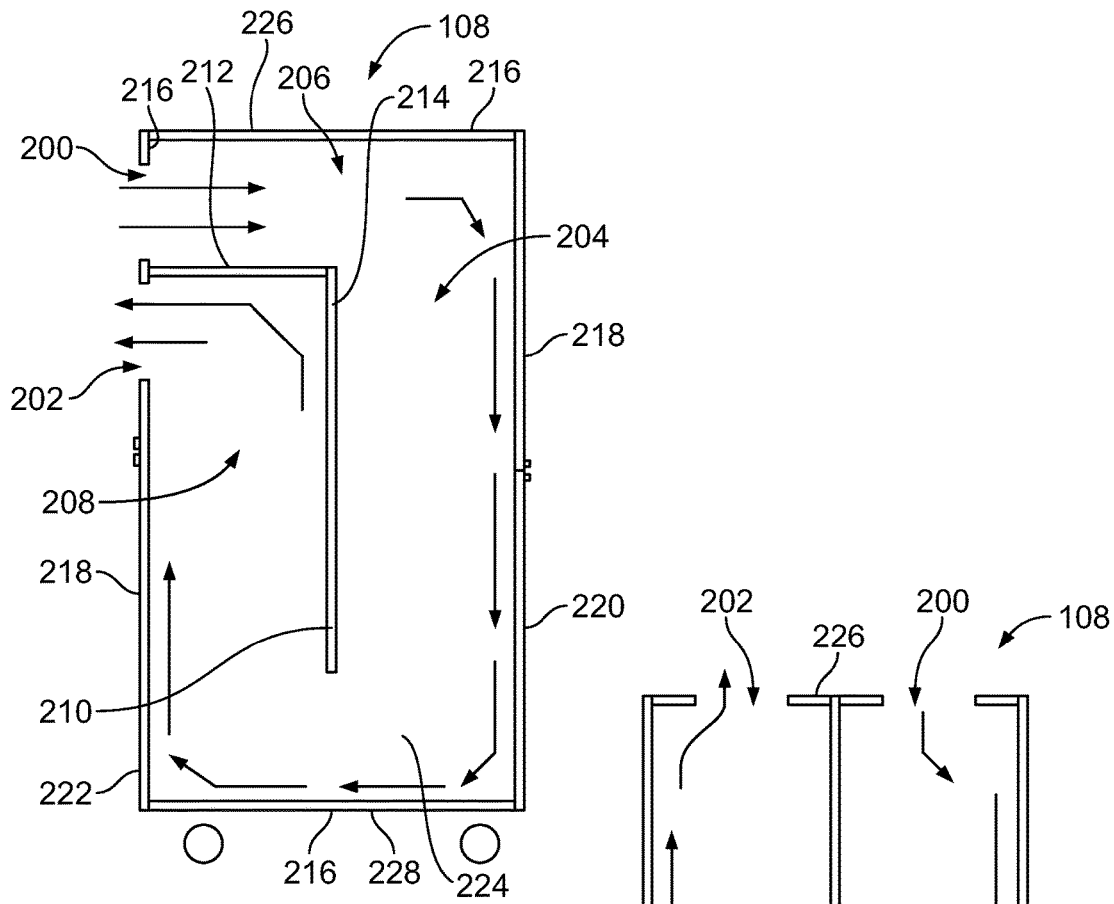
FIG. 5 is a cross-sectional view of a galley cart of the galley system in accordance with an exemplary embodiment.

FIG. 5 is a cross-sectional view of the galley cart 108 in accordance with an exemplary embodiment. The galley cart 108 has an air-through-cart supply arrangement where the airflow supply and return system 118 (shown in FIG. 1) supplies cooled air to the galley cart 108 through a supply port 200 and returns air from the galley cart 108 through a return port 202. An airflow path is defined through an interior cavity 204 of the galley cart 108 to ensure that the cooled air flows past each of the trays (not shown) configured to be held in the galley cart 108. For example, in an exemplary embodiment, the galley cart 108 includes one or more barriers 210 in the interior cavity 204 that define a flow path from the supply port 200 to the return port 202.

The barriers 210 define a supply chamber 206 and a return chamber 208 in the interior cavity 204. The barriers 210 separate the supply chamber 206 from the return chamber 208 to ensure that the air flows through the entire interior cavity 204 and is not short circuited between the supply port 200 and the return port 202. The barriers 210 prevent reingestion of the cooled air from the supply port 200 directly into the return port 202 (which is referred to as "short circuiting") by forcing the air to flow around the barriers 210 through the entire interior cavity 204. The barriers 210 span across the interior cavity 204 to separate the chambers 206, 208. In the illustrated embodiment, the galley cart 108 includes two barriers 210, namely a horizontal barrier 212 and a vertical barrier 214; however the galley cart 108 may include any number of barriers 210 in other embodiments.

The galley cart 108 includes a plurality of walls, generally identified by reference 216, and may include a plurality of doors, generally identified by reference 218. The walls 216 and doors 218 define the interior cavity 204. The walls 216 may be metal or non-metal panels defining the general shape of the galley cart 108 and some of the walls 216 may include openings, which may be closed by the doors 218.

In the illustrated embodiment, the galley cart 108 includes a front 220 and a rear 222 with sides 224 extending therebetween. The galley cart 108 includes a top end 226 and a bottom end 228. The front 220, rear 222, sides 224, top end 226 and bottom end 228 are defined by corresponding walls 216. The galley cart 108 may be configured to hold a plurality of trays in the interior cavity 204. For example, the galley cart 108 may hold a front column of trays near the front 220 and a rear column of trays near the rear 222. The trays may be loaded into and removed from the galley cart 108 through the front 220 and/or through the rear 222. The trays may hold food, drinks or other items needing cooling. The cool air supplied to the galley cart 108 flows over the trays as the air flows from the supply port 200 to the return port 202.

In an exemplary embodiment, the barriers 210 divide the interior cavity 204 into the supply chamber 206 and the return chamber 208. The barriers 210 are positioned between the supply port 200 and the return port 202. For example, the barrier 212 extends forward from the rear 222 at a location between the supply port 200 and the return port 202 and may be generally parallel to, and spaced apart from, the top end 226. At least some of the barriers 210 may be positioned between the trays, such as between the front column of trays and between the rear column of trays or between different rows of trays. Optionally, the barriers 210 may be movable to ease loading or unloading of the trays. For example, the barriers 210 may be foldable or collapsible and/or the barriers 210 may be removable.

In an exemplary embodiment, the supply port 200 and the return port 202 are vertically stacked immediately adjacent each other at the rear 222. The supply port 200 is in direct flow communication with the supply chamber 206 and the return port 202 is in direct flow communication with the return chamber 208. The supply chamber 206 is in flow communication with the return chamber 208 remote from the ports 200, 202. For example, the supply chamber 206 and the return chamber 208 may be similarly sized (e.g., each encompassing approximately half of the interior cavity 204). The supply and return ports 200, 202 are positioned to interface with the supply and return ducts 132, 134 (shown in FIG. 2), such as via the supply and return devices 180, 182 (shown in FIG. 2). Optionally, vents or other airflow devices may be provided at the ports 200, 202 to interface with the ducts 132, 134 and/or devices 180, 182. Providing both ports 200, 202 adjacent each other, such as at the top end 226 allows the ducts 132, 134 and corresponding devices 180, 182 to be located adjacent each other to allow a portion of the rear wall 166 (shown in FIG. 2) of the galley to be moved inward to increase the space in the passenger area. In an exemplary embodiment, the ports 200, 202 are wide and narrow to allow a large amount of airflow therethrough while maintaining a low profile. In other alternative embodiments, rather than having the ports 200, 202 vertically stacked with the horizontal barrier 212 therebetween, the ports 200, 202 may be stacked side-by-side and a single vertical barrier may be positioned therebetween that is oriented parallel to the sides 224. In other various embodiments, two sets of ports 200, 202 may be provided, one at the top and the other at the bottom of the galley cart 108 so that the galley cart 108 can be used in different types of cart compartments (e.g., in cart compartments having the supply and return ducts 132, 134 at the top (FIG. 2) and in cart compartments having the supply and return ducts at the bottom (FIG. 3)). The barriers 210 may be configurable to ensure proper airflow.

In the illustrated embodiment, the supply port 200 and the return port 202 are positioned at or near the top end 226; however the ports 200, 202 may be at or near the bottom end 228 in alternative embodiments. Optionally, the supply port 200 is positioned above the return port 202 and the airflow is clockwise in the interior cavity 204; however the return port 202 may be positioned above the supply port 200 in other embodiments, which may define counter-clockwise airflow in the interior cavity 204. In the illustrated embodiment, the supply chamber 206 is positioned above the return chamber 208 (e.g., above the horizontal barrier 212) and forward of the return chamber 208 (e.g., forward of the vertical barrier 214). The supply chamber 206 generally extends along the top end 226 and the front 220. The return chamber 208 is positioned below the supply chamber 206 (e.g., below the horizontal barrier 212) and rearward of the supply chamber 206 (e.g., rearward of the vertical barrier 214). The return chamber 208 generally extends along the bottom end 228 and the rear 222. Other arrangements are possible in alternative embodiments.

Figure 6:
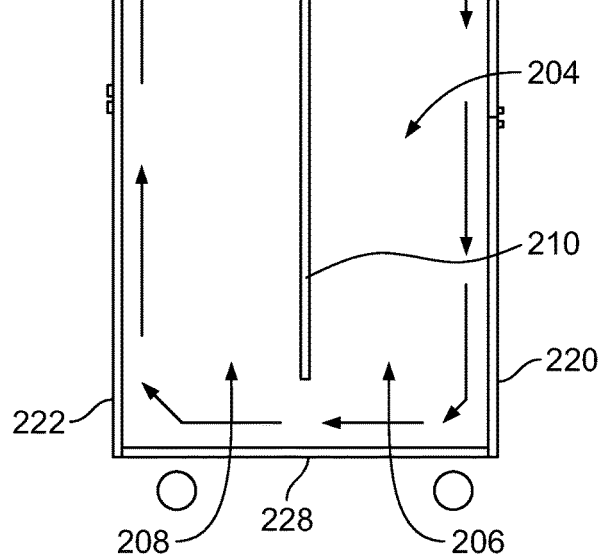
FIG. 6 is a cross-sectional view of a portion of the galley cart in accordance with an exemplary embodiment.

FIG. 6 is a cross-sectional view of a portion of the galley cart 108 in accordance with an exemplary embodiment. FIG. 6 illustrates various components of the galley cart 108 in different locations than the embodiment illustrated in FIG. 5. The supply and return ports 200, 202 are located along the top end 226 as opposed to along the rear 222. In an alternative embodiment, rather than being located at the top end 226, the supply and return ports 200, 202 may be located at the bottom end 228 for interfacing with corresponding supply and return ducts (not shown) below the galley cart 108.

The galley cart 108 includes a single vertical barrier 210 to divide the interior cavity 204 into the supply chamber 206 and the return chamber 208 as opposed to multiple barriers as with the embodiment illustrated in FIG. 5. The barrier 210 extends from the top end 226 into the interior cavity 204, and may extend substantially entirely to the bottom end 228. The barrier 210 may be approximately centered between the front 220 and the rear 222 allowing trays to be loaded into the interior cavity in front of and behind the barrier 210.

The galley cart 108 locates the ports 200, 202 to interface with the supply and return ducts 132, 134 (shown in FIG. 4) when the supply and return ducts 132, 134 are located under the counter 105 as opposed to along the rear wall 166 (shown in FIG. 4). Providing both ports 200, 202 adjacent each other along the top end 226 allows the ducts 132, 134 (and corresponding devices 180, 182) to be located adjacent each other to allow a portion of the rear wall 166 of the galley to be moved inward to increase the space in the passenger area.

Optionally, the ports 200, 202 may be staggered, such as vertically offset, to allow clearance of the rearward port 200 to pass the forward return duct 134. In other embodiments, the devices 180, 182 may be movable into engagement with the galley cart 108 after the galley cart 108 is loaded into the cart compartment 102. For example, the galley cart 108 may be pushed against a lever or other mechanism as the galley cart 108 is loaded into the cart compartment 102. The lever may cause the devices 180, 182 to move toward the top end 226 to interface with the ports 200, 202. Other arrangements are possible to ensure that the ducts 132, 134 are in flow communication with the ports 200, 202 when the galley cart 108 is loaded into the cart compartment 102.

A galley system is provided for an aircraft that supplies cooling air to a compartment of a galley for cooling galley carts. The supply and/or return ducts and supply and/or return devices for the airflow are arranged adjacent each other to reduce a size or footprint of the galley monument. Additional space is provided in the passenger compartment by shifting the walls of the cart compartment inward (e.g., closer to the galley cart), such as for adding additional room for passenger seating. The galley cart is designed to interface with the supply and return ducts. The galley cart includes barriers to control the airflow within the internal cavity of the galley cart to ensure that the entire galley cart is cooled.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A galley comprising:
   a rear wall;
   a mid-wall oriented with respect to the rear wall;
   a cart compartment at least partially defined by the rear wall and the mid-wall, the cart compartment being configured to receive at least one galley cart;
   a first duct defined in the rear wall below the mid-wall and in flow communication with the cart compartment; and
   a second duct defined in the rear wall adjacent the first duct and in flow communication with the cart compartment;
   wherein the rear wall below the mid-wall is jogged inward relative to the position of the rear wall above the mid-wall such that the rear wall is non-planar.

2. The galley of claim 1, wherein a bottom of the rear wall below the mid-wall is jogged inward to reduce a width of the cart compartment at the bottom compared to at the mid-wall.

3. The galley of claim 1, wherein the first and second ducts are positioned near the mid-wall, the rear wall being jogged inward below the first and second ducts to reduce a width of the cart compartment below the first and second ducts.

4. The galley of claim 1, wherein the first and second ducts are positioned at or near a bottom of the rear wall, the rear wall being jogged inward above the first and second ducts to reduce a width of the cart compartment.

5. The galley of claim 1, wherein the first and second ducts are positioned side-by-side at a common vertical height along the rear wall.

6. The galley of claim 1, further comprising a supply duct and a return duct in the rear wall above the first and second ducts, the supply duct being in flow communication with either the first duct or the second duct, the return duct being in flow communication with the other of the first duct or the second duct, the rear wall along the supply and return ducts and along the first and second ducts defining an upper rear wall, the rear wall below the supply and return ducts and below the first and second ducts defining a lower rear wall, the lower rear wall being forward of the upper rear wall.

7. The galley of claim 1, further comprising a galley cart received in the cart compartment, the galley cart comprising walls defining an interior cavity, the interior cavity extending between a top end and a bottom end, a supply port in flow communication with the interior cavity at the top end and a return port in flow communication with the interior cavity at the top end, the galley cart comprising a barrier positioned between the supply port and the return port within the interior cavity of the cart, wherein the supply port is in flow communication with the first duct and the return port is in flow communication with the second duct, the barrier controlling airflow through the interior cavity between the supply and return ports.

8. A galley comprising:
   a rear wall;
   a mid-wall oriented with respect to the rear wall;
   a cart compartment at least partially defined by the rear wall and the mid-wall, the cart compartment being configured to receive at least one galley cart;
   a first duct defined in the rear wall below the mid-wall and in flow communication with the cart compartment;
   a second duct defined in the rear wall adjacent the first duct and in flow communication with the cart compartment; and
   a galley cart received in the cart compartment, the galley cart comprising walls defining an interior cavity, the interior cavity extending between a top end and a bottom end, a supply port in flow communication with the interior cavity at or near the top end and a return port in flow communication with the interior cavity adjacent the supply port at or near the top end, the galley cart comprising a barrier positioned between the supply port and the return port within the interior cavity of the cart, wherein the supply port is in flow communication with the first duct and the return port is in flow communication with the second duct, the barrier controlling airflow through the interior cavity between the supply and return ports.

9. The galley of claim 8, wherein the supply port and the return port are vertically stacked immediately adjacent each other along the rear of the galley cart with the barrier extending from the rear at a location between the supply port and the return port.

10. The galley of claim 8, wherein the barrier forces airflow through the entire interior cavity between the supply port and the return port.

11. The galley of claim 2, wherein the barrier includes a horizontal barrier extending horizontally at least partially between the rear and the front of the galley cart and a vertical barrier extending vertically at least partially between the top end and the bottom end.

12. The galley of claim 2, wherein the barrier extends from the rear into the interior cavity.

13. The galley of claim 2, wherein the barrier extends from the top end into the interior cavity.

14. The galley of claim 2, wherein the barrier is movable within the interior cavity.

15. The galley of claim 2, wherein the barrier is approximately centered between the front and the rear allowing space for a tray to be positioned in the interior cavity forward of the barrier and allowing space for a tray to be positioned in the interior cavity rearward of the barrier.

16. The galley of claim 8, wherein at least one of the supply port and the return port are provided proximate to the top end.

17. The galley of claim 8, wherein at least one of the supply port and the return port are provided proximate to the bottom end.

18. The galley of claim 8, wherein at least one of the supply port and the return port are provided in a rear wall at the rear of the galley cart.

19. The galley of claim 8, wherein the supply chamber is positioned above the return chamber extending along the top end and the supply chamber is positioned forward of the return chamber at the front, and wherein the return chamber is positioned below the supply chamber extending along the bottom end and the return chamber is positioned rearward of the supply chamber at the rear.

20. The galley of claim 8, wherein the return chamber is positioned above the supply chamber extending along the top end and the return chamber is positioned forward of the supply chamber at the front, and wherein the supply chamber is positioned below the return chamber extending along the bottom end and the supply chamber is positioned rearward of the return chamber at the rear.

21. The galley of claim 8, wherein supply port is an upper supply port and the return port is an upper return port, the galley cart further comprising a lower supply port at or near the bottom end and a lower return port at or near the bottom end.

22. The galley of claim 8, wherein the rear wall below the mid-wall is jogged inward relative to the position of the rear wall above the mid-wall such that the rear wall is non-planar.

23. The galley of claim 8, wherein the first and second ducts are positioned near the mid-wall, the rear wall being jogged inward below the first and second ducts to reduce a width of the cart compartment below the first and second ducts.

24. The galley of claim 8, wherein the first duct and the second duct are both positioned at the rear wall and are both positioned at the mid-wall.

* * * * *

UNITED STATES PATENT AND TRADEMARK OFFICE
CERTIFICATE OF CORRECTION

PATENT NO. : 9,957,050 B2  
APPLICATION NO. : 14/716357  
DATED : May 1, 2018  
INVENTOR(S) : Thomas Joseph Moran Page 1 of 1

It is certified that error appears in the above-identified patent and that said Letters Patent is hereby corrected as shown below:

In the Claims

Column 13, Line 49 Claim 11: Delete "The galley of Claim 2," and insert --The galley of Claim 8,--

Column 14, Line 1 Claim 12: Delete "The galley of Claim 2," and insert --The galley of Claim 8,--

Column 14, Line 3 Claim 13: Delete "The galley of Claim 2," and insert --The galley of Claim 8,--

Column 14, Line 5 Claim 14: Delete "The galley of Claim 2," and insert --The galley of Claim 8,--

Column 14, Line 7 Claim 15: Delete "The galley of Claim 2," and insert --The galley of Claim 8,--, therefor Signed and Sealed this  
Third Day of July, 2018

Andrei Iancu  
*Director of the United States Patent and Trademark Office*